(12) United States Patent
Regula (10) Patent No.: US 8,521,941 B2
(45) Date of Patent: Aug. 27, 2013

(54) MULTI-ROOT SHARING OF SINGLE-ROOT INPUT/OUTPUT VIRTUALIZATION

(75) Inventor: Jack Regula, Chapel Hill, NC (US)

(73) Assignee: PLX Technology, Inc., Sunnyvale, CA (US)

( * ) Notice: Subject to any disclaimer, the term of this patent is extended or adjusted under 35 U.S.C. 154(b) by 336 days.

(21) Appl. No.: 12/979,904

(22) Filed: Dec. 28, 2010

(65) Prior Publication Data
US 2012/0166690 A1 Jun. 28, 2012

(51) Int. Cl.
*G06F 13/42* (2006.01)
*G06F 13/20* (2006.01)

(52) U.S. Cl.
USPC .................. 710/313; 710/105; 710/305

(58) Field of Classification Search
USPC ................................. 710/104, 305, 313
See application file for complete search history.

(56) References Cited

U.S. PATENT DOCUMENTS

| | | | |
|---|---|---|---|
| 7,934,033 B2 * | 4/2011 | Malwankar et al. | 710/104 |
| 8,312,187 B2 * | 11/2012 | Rodrigues et al. | 710/52 |
| 8,341,327 B2 * | 12/2012 | Baba et al. | 710/316 |
| 2009/0268738 A1 * | 10/2009 | Tchapda | 370/392 |
| 2012/0096192 A1 * | 4/2012 | Tanaka et al. | 710/20 |
| 2012/0167085 A1 * | 6/2012 | Subramaniyan et al. | 718/1 |

OTHER PUBLICATIONS

"Using PCIe in a variety of multiprocessor system configurations"—by Jack Regula, PLX Technology; 6 pages, Dated Jan. 23, 2007.*
"Using Non-transparent Bridging in PCI Express Systems"—by Jack Regula; 31 pages, Dated Jun. 1, 2004.*
"Single Root I/O Virtualization and Sharing Specification Revision 1.0", 84 pages, Dated Sep. 11, 2007.*

* cited by examiner

*Primary Examiner* — Brian Misiura
(74) *Attorney, Agent, or Firm* — Beyer Law Group LLP (57) ABSTRACT

In a first embodiment of the present invention, a method for multi-root sharing of a plurality of single root input/output virtualization (SR-IOV) endpoints is provided, the method comprising: CSR redirection to a management processor which either acts as a proxy to execute the CSR request on behalf of the host or filters it and performs an alternate action, downstream routing of memory mapped I/O request packets through the switch in the host's address space and address translation with VF BAR granularity, upstream routing of requests originated by I/O devices by table lookup indexed by Requester ID, and requester ID translation using a fixed local-global RID offset.

17 Claims, 10 Drawing Sheets

MULTI-ROOT SHARING OF SINGLE-ROOT INPUT/OUTPUT VIRTUALIZATION

BACKGROUND OF THE INVENTION

1. Field of the Invention

The present invention relates generally to electronic communication. More specifically, the present invention relates to the sharing of single-root input/output virtualization devices by multiple roots.

2. Description of the Related Art

Virtualization involves a way to run multiple environments on a single device or system. Using virtualization, extra processing power and/or storage on a device can be more efficiently used by sharing it between more than one environment. Each environment is known as a virtual machine (VM), and typically these systems are constructed in a manner that allows programs running within a virtual machine to operate without knowledge that the environment is sharing resources with other environments.

In addition to interoperability, virtual machines also must take into account security concerns. Typically, I/O virtualization solutions provide the same isolation that was found when the environment was operating on a separate physical machine. Isolation involves separation of memory space, input/output (I/O) streams, interrupts, and the ability to isolate control operations, I/O operations, and errors.

Computer architectures have advanced greatly over the years. Lately it is becoming more and more commonplace for chip designers to include external data interfaces, such as Universal Serial Bus (USB) interfaces into their motherboards. These interfaces are known as host controllers. The processor is typically then connected to the other components of the computer system via an input/output (I/O) interconnect system.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to run must faster.

Recently, a successor to PCI has been popularized, termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

In order to standardize a way to share PCIe devices in a way that virtualization goals are still met, the Single-Root Input/Output Virtualization (SR-IOV) standard was introduced. SR-IOV provides a mechanism by which a single root function (such as a single Ethernet port) can appear to be multiple separate physical devices. In this manner, a port leading to a PCIe device can be shared between multiple virtual machines, thus effectively sharing the PCIe devices between the virtual machines without either virtual machine needing to be aware of the existence of the other.

An SR-IOV-capable device (such as a PCIe endpoint) can be configured to appear in the PCI configuration space as multiple functions, each with its own configuration space complete with Base Address Registers (BARs). A virtual machine manager (VMM) assigns one or more virtual functions to a virtual machine by mapping the actual configuration space of the virtual functions to the configuration space presented to the virtual machine by the VMM.

Figure 1:
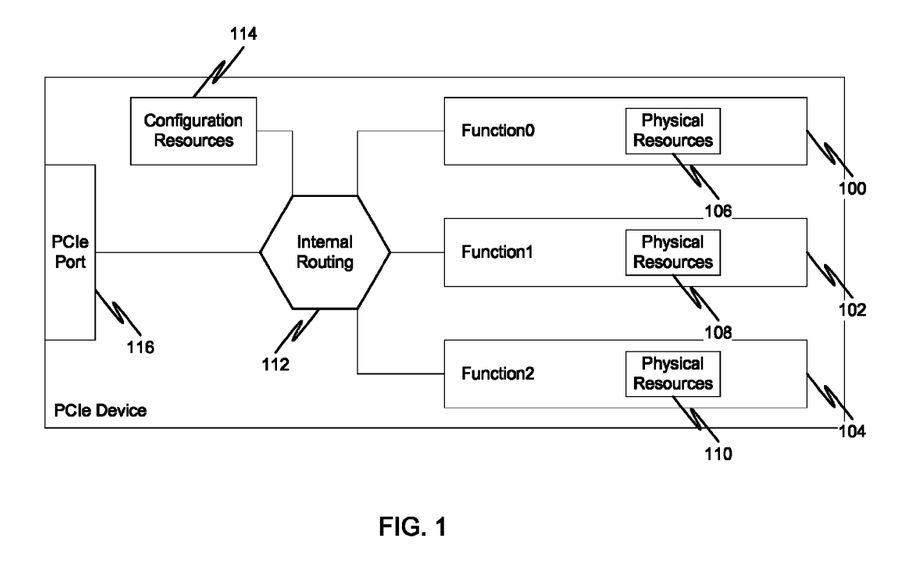
FIG. 1 depicts a standard PCIe device, having three different functions, each with its own physical resources.

As an example, FIG. 1 depicts a standard PCIe device, having three different functions 100, 102, 104, each with its own physical resources 106, 108, 110, respectively, as well as internal routing 112, configuration resources 114, and a PCIe port 116. PCIe functionality shared by all functions is managed through function 100. It should be noted that while this figure illustrates only three functions, a PCIe device can typically support up to 256 functions.

Figure 2:
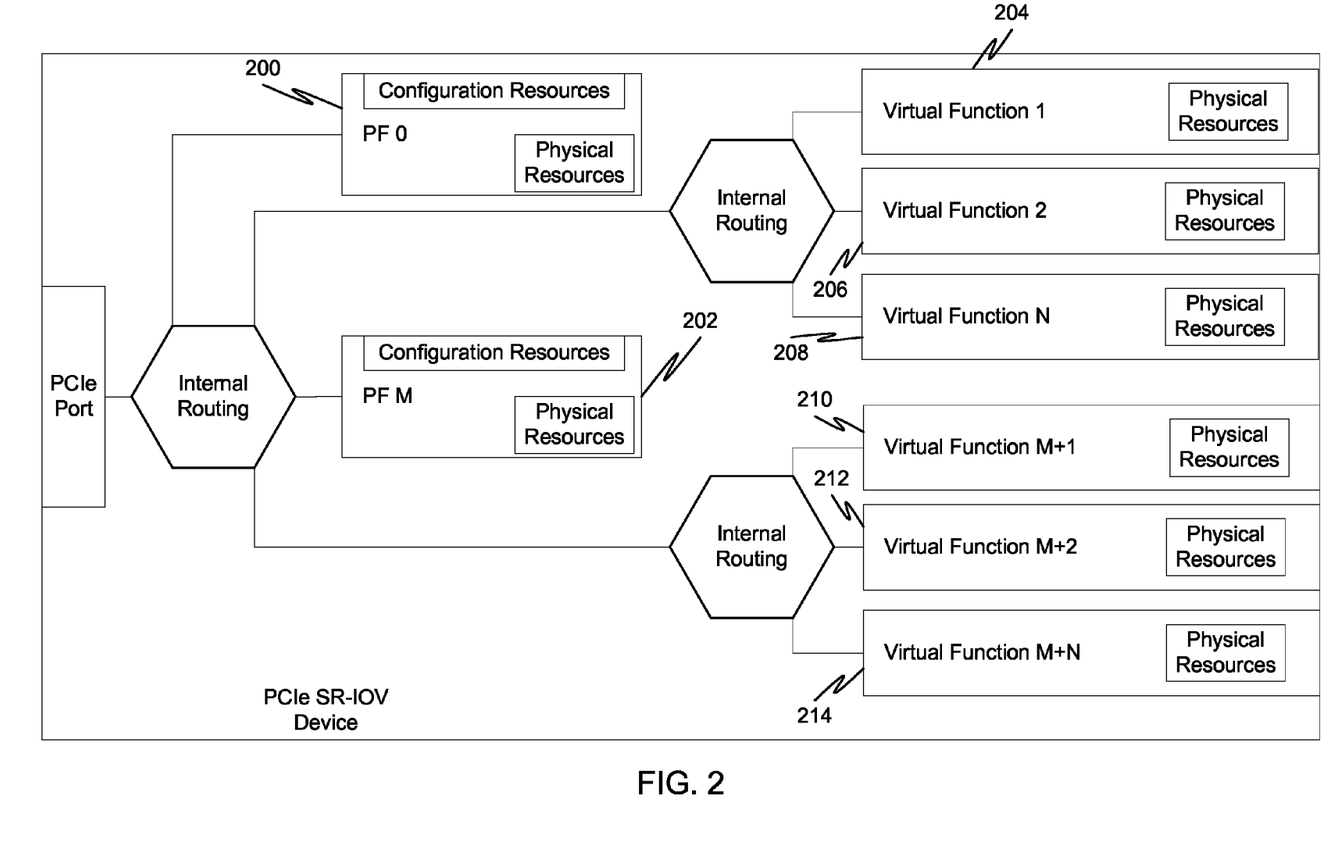
FIG. 2 depicts an SR-IOV endpoint having a physical function and multiple virtual functions.

SR-IOV introduces the concepts of physical functions and virtual functions. A physical function is a PCIe function that supports the SR-IOV capability. A virtual function is a lightweight function that is associated with a physical function but that can be assigned to a particular virtual machine. In other words, each physical function may be assigned multiple virtual functions, and then each of these multiple virtual functions can be assigned to a different virtual machine, effectively sharing the physical function without any of the other virtual machines being aware of this. All of this capability is managed through the Virtual Machine Manager (VMM). This is depicted in FIG. 2. Here, a PCIe SR-IOV capable device is shown having two physical functions 200, 202, and each physical function is shown having three virtual functions 204, 206, and 208, and then 210, 212, and 214, respectively. It should be known that two physical functions and three virtual functions per physical functions are just examples depicted in this diagram. In reality, there can be any number of physical functions (up to device limits), and each physical function can have a different number of associated virtual functions.

While SR-IOV allows multiple virtual machines within a single host to share physical resources, there is no capability to allow virtual machines across multiple hosts to share physical resources. That is why it is known as "Single-Root" IOV, because it only allows a single root complex, and thus a single host, to share resources of an attached PCIe device.

With PCIe devices expanding every year, it is now more standard to have devices, such as switches, connecting multiple hosts to multiple PCIe devices. It would be advantageous to allow these multiple hosts to share PCIe endpoint functions, because it would allow for the PCIe endpoint functions to be dynamically provisioned among the hosts to meet workload requirements. One proposed solution is known as Multi-Root Input/Output Virtualization (MR-IOV). This method has been standardized, however due to resource limitations it has not proved popular, and is barely in use. Even if one were to try and implement it on a new switch, the lack of availability of MR-IOV compatible PCIe endpoints would make such a switch virtually useless.

What is needed is a solution that allows the multi-root sharing of endpoint functions using the existing SR-IOV standard that is in use by a large number of devices, thus having the advantages of MR-IOV without needing to actually implement MR-IOV.

SUMMARY OF THE INVENTION

In a first embodiment of the present invention, a method for multi-root sharing of a plurality of single root input/output virtualization (SR-IOV) endpoints is provided, the method comprising: receiving a control and status register (CSR) request packet from a first host, wherein the CSR request packet is a CSR Space packet or a memory mapped I/O request packet, wherein the CSR request packet is addressed to a first of the plurality of SR-IOV endpoints; and redirecting the CSR request packet to a centralized management processor so that the centralized management processor may act as a proxy to communicate with the first of the plurality of SR-IOV endpoints.

In a second embodiment of the present invention, a method for multi-root sharing of a plurality of single root input/output virtualization (SR-IOV) endpoints is provided, the method comprising: receiving a memory mapped I/O request packet whose address hits in a first base address register (BAR0) of a virtual function of a first of the plurality of SR-IOV endpoints; and redirecting the memory request to a centralized management processor so that the centralized management processor may either act as a proxy to communicate with the first of the plurality of SR-IOV endpoints or filter the operation and instead perform an alternative operation.

In a third embodiment of the present invention, a method for multi-root sharing of a plurality of single root input/output virtualization (SR-IOV) endpoints is provided, the method comprising: receiving a control and status register (CSR) request from a first host, wherein the CSR request is addressed to a first of the plurality of SR-IOV endpoints; and redirecting the CSR request to a centralized management processor so that the centralized management processor may filter the CSR request and instead perform an alternative operation.

In a fourth embodiment of the present invention, a system is provided comprising: a switch having: a plurality of upstream ports, each upstream port connected to a different host and each represented by both a virtual transparent PCI-PCI bridge and a non-transparent bridge; a plurality of downstream ports, each downstream port connected to a different SR-IOV endpoint and each represented by a virtual PCI-PCI bridge; a management processor; a memory associated with the management processor, wherein the memory contains a plurality of CSR registers that control the virtual PCI-to-virtual PCI bridges; wherein the switch is configured to: receive a control and status register (CSR) request packet from a first host, wherein the CSR request packet is a CSR Space packet or a memory mapped I/O request packet, wherein the CSR request packet is addressed to a first of the plurality of SR-IOV endpoints; and redirect the CSR request packet to a centralized management processor so that the centralized management processor may act as a proxy to communicate with the first of the plurality of SR-IOV endpoints.

In a fifth embodiment of the present invention, an apparatus for multi-root sharing of a plurality of single root input/output virtualization (SR-IOV) endpoints, the apparatus comprising: means for receiving a control and status register (CSR) request packet from a first host, wherein the CSR request packet is a CSR Space packet or a memory mapped I/O request packet, wherein the CSR request packet is addressed to a first of the plurality of SR-IOV endpoints; and means for redirecting the CSR request packet to a centralized management processor so that the centralized management processor may act as a proxy to communicate with the first of the plurality of SR-IOV endpoints.

In a sixth embodiment of the present invention, a program storage device readable by a machine tangibly embodying a program of instructions executable by the machine to perform a method for multi-root sharing of a plurality of single root input/output virtualization (SR-IOV) endpoints, the method comprising: receiving a control and status register (CSR) request packet from a first host, wherein the CSR request packet is a CSR Space packet or a memory mapped I/O request packet, wherein the CSR request packet is addressed to a first of the plurality of SR-IOV endpoints; and redirecting the CSR request packet to a centralized management processor so that the centralized management processor may act as a proxy to communicate with the first of the plurality of SR-IOV endpoints.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, multi-root sharing of SR-IOV endpoints is provided, which allows for the dynamic allocation of virtual functions to virtual machines running on multiple hosts, while still utilizing the SR-IOV standard, permitting existing SR-IOV endpoints and their driver software to be utilized without modification. One embodiment of the present invention is embodied in a novel PCIe switch, however one of ordinary skill in the art will recognize that other types of devices could implement some or all of the various functions of the present invention and nothing in this disclosure shall be construed as limiting the scope of the invention to merely PCIe switches.

MR-SR-IOV is an acronym that can be applied to the present invention, which involves a novel use of SR-IOV that is different than prior art MR-IOV solutions. Through a variety of mechanisms, SR-IOV endpoints, such as PCIe endpoints, can be shared among multiple independent processors. The shared endpoints are located in a global space created by the non-transparent bridges of the hosts. Address and requester identifier translations map transactions between a local space, such as memory set aside for access to the registers of virtual functions, and the global space. Different translation algorithms may be used for shared I/O than for host-to-host communications. In the shared I/O usage, address translation is required only for mapping downstream requests, such as memory mapped I/O (MMIO) access to virtual function control and status registers (CSRs) by a host. Transactions sent upstream by a shared device are routed by table look up based on (i.e., indexed by) the global space requester identifier, such as a Requester ID, without address translation.

In order to property implement MR-SR-IOV, a number of different functionalities are provided. While in many instances all of these functionalities will be implemented together, it is possible that only a subset of these functionalities are provided in any one implementation. As such, nothing in this disclosure shall be construed as limiting the invention to including all of these functionalities together (different permutations are possible and, indeed, foreseen).

Additionally, while is expected that some of the functionalities will be implemented by hardware mechanisms in the PCIe switch, others will be implemented in software running on the management processor. The functions may be implemented by multiple entities, either in a coordinated effort or independently.

The functionalities include CSR redirection to a management processor, downstream routing through the switch in the host's address space and address translation with VF BAR granularity, upstream routing by table lookup indexed by Requester ID, and requester ID translation by fixed local-global RID offset. Each of these functionalities will be described in detail.

The Management Processor

The management processor may be responsible for enumerating the fabric and configuring it according to the rules defined herein. If the fabric includes shared I/O it may have additional responsibilities, including running PF drivers for some shared devices, virtualizing PFs of some or all of the shared endpoints, filtering operations on control status registers (i.e. implementing an alternative to certain specific requested register operations) in shared endpoints and/or in virtualized PFs in order to enable/facilitate sharing or avoid need for changes to drivers running on sharing hosts, participating in error management and hot plug, and interfacing with platform management software.

CSR Redirection

CSR redirection is perhaps the primary enabler of MR-SR-IOV. In one embodiment of the present invention, a transaction layer packet (TLP) spooling mechanism is provided for each host port. This spooling mechanism creates a buffer of redirected CSR request TLPs (and optionally also memory space requests that target CSR space via the BAR0 of a VF of an SR-IOV endpoint) in the memory of a management processor and a cursor register for returning completions and sending error messages, other PCIe defined messages, and message-signaled interrupt (MSI/MSI-X) posted write TLPs to the host port. These mechanisms can be implemented at a non-transparent bridge at each host port.

It should be noted that the term "CSR request," as used throughout this disclosure, is intended to mean a PCIe TLP that uses the CSR request format or a PCIe TLP that uses the memory space request format but whose address hits in a BAR0 of a virtual function or physical function of an SR-IOV endpoint. In some instances, both CSR space and memory space accesses that in a BAR0 are redirected. In others, only CSR space accesses are redirected.

Redirecting CSRs to a management processor allows it to virtualize both the device in which it is operating (e.g., PCIe switch) and the physical functions of the multi-root shared SR-IOV endpoints attached to that device. Because the device is virtualized, each sharing host sees a standard, transparent path to the endpoints in its virtual hierarchy. Virtualizing the physical functions of the SR-IOV endpoints allows them to be shared among multiple hosts.

Figure 3:
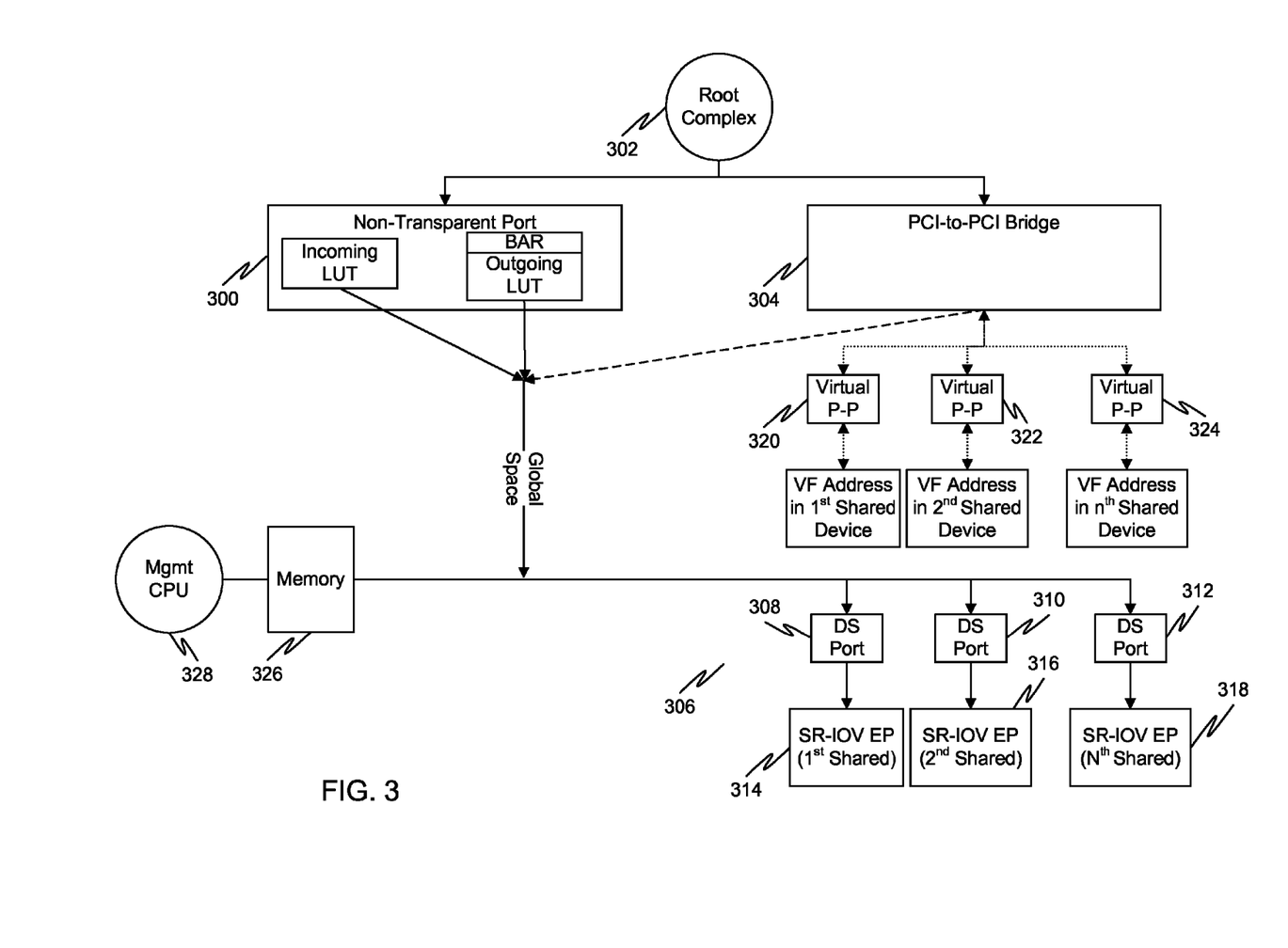
FIG. 3 is a diagram illustrating both the physical and virtual hierarchies for a single host's shares of several SR-IOV endpoints in accordance with an embodiment of the present invention.

FIG. 3 is a diagram illustrating both the physical and virtual hierarchies for a single host's shares of several SR-IOV endpoints in accordance with an embodiment of the present invention. The physical structures include the non-transparent port 300 (which connects to host 302), the transparent PCI-PCI bridge of the upstream port 304, and the global space/management hierarchy 306 where the SR-IOV endpoints connect. For each downstream port 308, 310, 312 in the management hierarchy 506 that connects to a share endpoint 314, 316, 318, there is a corresponding emulated virtual PCI-PCI bridge 320, 322, 324, respectively. The emulated virtual PCI-PCI bridges' only registers are located in a memory 326 of the management processor 328 and which are accessed by redirecting CSR requests to the management processor 328.

All CSR requests to functions on the upstream link of a host port that aren't physically implemented within the switch or that target a bus number equal to or greater than the secondary bus register of the upstream port's virtual bridge, and that in addition don't cause a hit in the physical address decode process, are redirected to the management processor as described herein. The management processor parses these requests in its software and then returns a completion TLP via a cursor register in the NTB provided for that purpose.

If the redirected CSR request targets a VF owned by its source, then the management processor simply executes the request itself as a proxy for the source host. If the CSR request targets a physical function of an SR-IOV endpoint shared by multiple hosts, then the action required by the management processor may be more complex. In such a case, the management processor may virtualize the single physical function to create a virtual physical function for each host and then filter operations on those physical functions by the hosts in order to prevent mutual interference. Thus, the management processor can either act as a proxy or perform a filtering operation where an alternative operation is performed in stead of acting as a proxy.

The CSR redirection architecture may be extended to support MR-IOV endpoints by supporting the MR prefix and flow control on the links between the switch and any MR-IOV endpoints.

Any downstream CSR request that maps to one of the bridges or to the shared endpoints below them may be spooled to the management processor by CSR re-direction. Their completions may be returned via a cursor register associated with the non-transparent upstream port that is written by the management processor.

Memory space requests to a shared virtual function, on the other hand, may be forwarded directly (i.e., without redirection) to the appropriate physical downstream port with both address and requester ID translation (described in more detail later), in some embodiments, in limited cases that don't hit in a BAR0 of a VF. Note also that if a memory space access whose address hits in a BAR0 of a VF is redirected to the management processor and the management processor then executes the request as a proxy for the whose request was redirected, the functionality is the same as in the case where the memory space request wasn't redirected, except for an increase in response latency.

After discovery, enumeration, and global space configuration by the management processor, enumeration and configuration of the shared endpoints by the hosts is allowed to begin. The management processor owns the physical functions in each SR-IOV endpoint and runs drivers for them (the simplest devices have a single PF, but more complex devices will have multiple PFs). The configuration performed by the management processor may include assigning contiguous blocks of virtual functions to the hosts according to policies or templates. It is not necessary to assign contiguous blocks, but that it the most efficient way to assign them when more than one VF of an SR-IOV endpoint is assigned to the same host. These policies or templates can be customized for use in individual implementations to provide the most efficient distribution of resources.

With CSR redirection, PCIe bus enumeration software running on a host can find at least one virtual physical function for each shared SR-IOV endpoint that exists only in the memory of the management processor. It also can discover the virtual functions assigned to it by the management processor that, despite being called virtual, have physical existence in the shared SR-IOV endpoints. The host then can receive completions to all CSR requests that it directs to these physical functions and virtual functions and cannot tell that its CSRs have been redirected, except perhaps for an additional latency. The management processor is able to filter each of these transactions and act like a hypervisor in deciding how to complete them. In general, it can perform the requested operation on a virtual function as a proxy for the host and relay the completion it receives back to the host. If, on the other hand, a physical function is addressed, the management processor can do what is necessary to maintain the illusion that a single host alone controls the SR-IOV endpoint without allowing such a host to do anything to the physical function that will disturb virtual functions owned by other hosts.

During configuration, it may be normal for a host to map the CSRs of its virtual function into memory space and then subsequently access them using MMIO instead of CSR requests. Once it does that it can avoid the latency hit of CSR redirection. Downstream memory requests into MMIO space receive address and Requester ID translation to target the SR-IOV in global space. Reverse Requester ID translations can be applied to completions returning upstream. The translated requester ID in the global space differs from the requester ID in the local space by a constant offset for all VFs in the same shared endpoint. The bus number in the global space of the translated requester ID is the same as that of the upstream port's non-transparent bridge. These translations may be configured by the management processor and thus be invisible to the hosts.

The shared endpoints also may send their memory requests directly upstream and receive completions directly from the host post at full bandwidth and without a latency hit due to redirection. Requests can be routed upstream by requester ID by using a table lookup. The table indicates which host each virtual function/requester ID is assigned to and routes its requests to that host without regard to any memory address in the request, except for the provision to route upstream by ID only if the address in the requests doesn't hit in the base and limit register of another downstream port or the option to route all error messages to the management processor independent of Requester ID. At the host port, the global requester ID can be translated to the local requester ID, which is consistent with the virtual hierarchy illustrated in FIG. 5. This mechanism can be used for interrupts and error messages as well as for memory requests.

Completions returning downstream from a host can have their global requester ID restored at the host port and then can be routed by requester ID to the virtual function that issued the corresponding request.

The management port is the upstream port of the shared space and may receive all request packets initiated by any of the physical functions, including their interrupts and error messages. Neither address nor requester ID translations need occur at the management port.

As described earlier, a spooling mechanism is provided for each port to support CSR redirection. The entire TLP of a packet that meets the redirection criterion defined above can be written as a posted write payload to the address defined in a pointer register. The switch creates a posted write header using the address in the redirection pointer register and appends the TLP to it as its payload. It then can forward the packet out of the downstream port to which the original CSR request was targeted—out the non-transparent bridge, using the standard switch data and control path. After each such use and before the next, the pointer register can then be incremented by the size of the TLP just forwarded. The redirection pointer register is in the CSR space of the link side non-transparent bridge endpoint. It may be convenient for the implementation to reserve a header RAM entry for the redirection header and maintain the pointer address directly in that RAM to simplify packet translation on the fly.

The pointer base address can be initially configured by the management processor to point to its memory. Thus, a first-in-first-out (FIFO) queue of redirected CSR request TLPs is formed in the management processor's memory. Each host connected to the fabric has an independent pointer in its own non-transparent bridge. The identity of the host is implicit in the queue in which a CSR request TLP is found.

The pointer register can be defined, like a BAR, by a base address and a power of two size. When the pointer value reaches base address+size, it can be wrapped back to the base address. To allow configuration by the management processor, the processor register is mapped into the CSR space of the NTB's link side EP.

Additionally, a mechanism is provided for the management processor to return completions to the redirected CSR requests as well for it to relay error and similar messages. This mechanism can be implemented in the link side non-transparent bridge endpoint for scalability—so that each host can have its own.

This mechanism has two pieces: a response packet register and a response trigger register. The response packet register is located in the virtual side non-transparent bridge endpoint CSR space. It can hold a complete packet to be forwarded to the link side of the non-transparent bridge endpoint of the target host port when triggered via the response trigger register. The response trigger register is located in the link side non-transparent bridge endpoint CSR space. Writing a 1 to the response trigger register trigger bit can trigger the sending of the response packet as described above. When this register is written in CSR space, the completion isn't returned until the packet has been sent. When the packet is sent, the response trigger register trigger bit is cleared. Thus, the management processor can also use memory space to write the response trigger register and then synchronize by polling. This may be more efficient when it is managing many blades.

In one embodiment, the response packet register is made large enough to hold a complete transaction layer packet consisting of at least a 16-byte header and 4-byte payload and is used to send MSI/MSI-X interrupts, and PCIe error and other messages to the host processor connected to the switch port.

To return a completion or send a message packet, the management processor can form a complete TLP in the response packet register and then write the response trigger register. Many of the fields in the response packet register can be re-used for multiple completions.

Downstream Routing and Address Translation

Downstream Routing

For shared I/O, routing may be performed downstream in the transparent virtual hierarchy created via CSR redirection. The virtual flow is through the transparent virtual PCI-PCI bridge of the upstream port and then down into virtual downstream ports.

The CSR headers for the virtual downstream ports may exist only in the memory of the management processor. However, their bus number and memory space base and limit registers do have physical existences. Similar to the partitioned switch mode, the management processor can tag address routing CAM entries (the set of base address registers and address comparators associated with a downstream port) with a host port affiliation so that only those entries tagged with a host's ID can participate in the address or ID decode for that host port's packets. Since this decode occurs only in the ingress of the host port, a copy of the CAM entry isn't needed elsewhere in the switch. Therefore, the base address register mirroring process used in standard single host domain switch mode can be disabled, freeing CAM entries for other host ports.

The programming model of the virtual hierarchies can match that of an MR-IOV switch.

This address decode operation completes with the identification of a virtual downstream port. Via a configuration register, that virtual downstream port can be associated with a physical downstream port to which the packet is routed. It can also be associated with a Local to Global Requester ID Offset that is used in Requester ID translation. After the local space address space decode routes a packet to a virtual downstream port, the requisite address (VF BAR mapping) and requester ID translations can be performed and then the packet can be forwarded to the associated downstream port.

Downstream Address Translation

While the shared endpoints can be virtually mapped into their hosts own hierarchy by means of CSR redirection, they are actually in global/shared space. Translation of the addresses in memory requests (MMIO transactions) traveling downstream from a host to the memory mapped registers of a virtual function (from the local domain to the global domain) is required.

Figure 4:
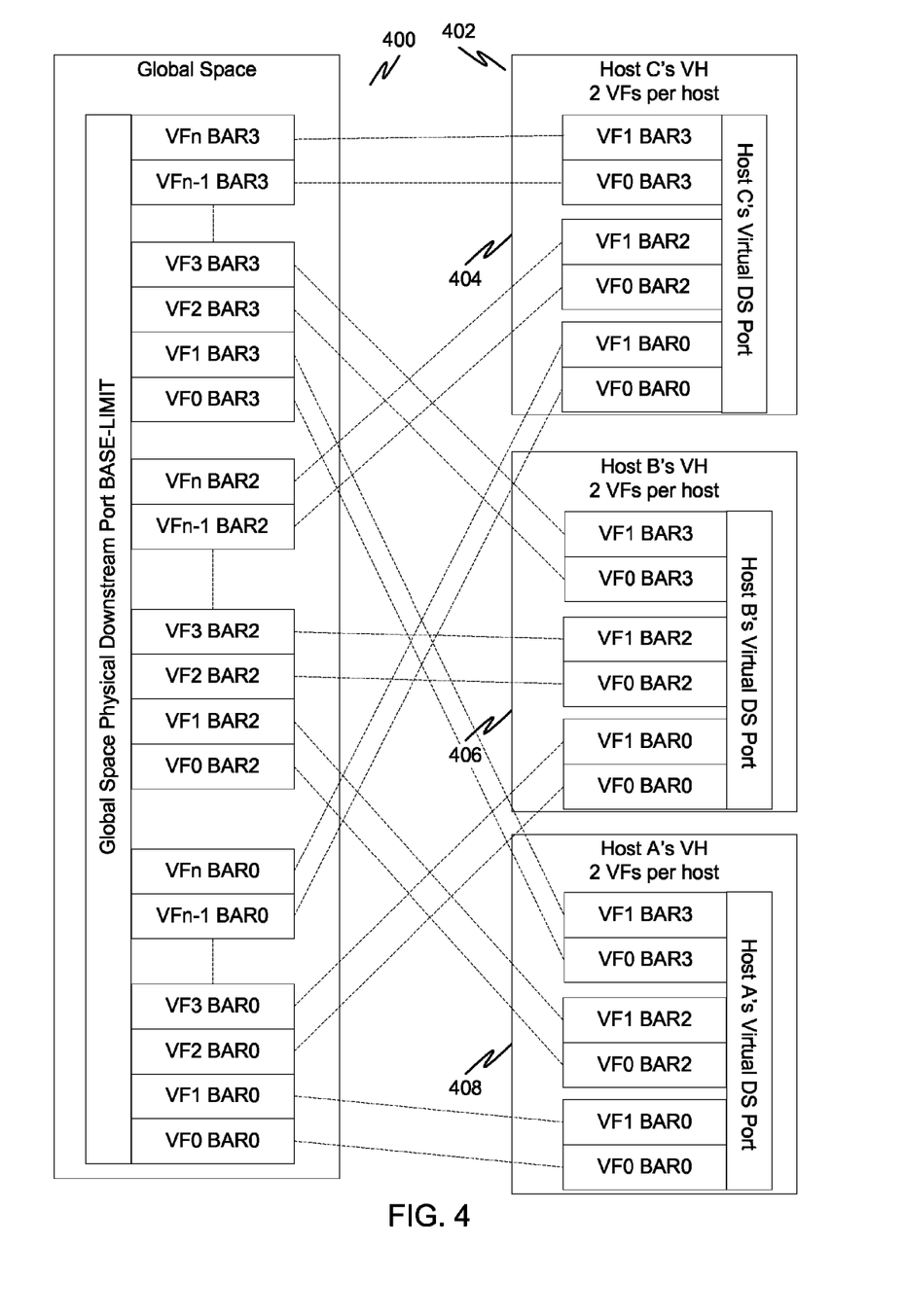
FIG. 4 depicts an example of necessary address translations for access of virtual function registers in Global Space by hosts in accordance with an embodiment of the present invention.

The necessary address translations for access of virtual function registers in Global Space by hosts are defined via the example of FIG. 4. The left side of the figure 400 shows the division of the virtual function BARs of an SR-IOV endpoint into a segment for each virtual function in Global Space. This SR-IOV endpoint has a single physical function and its virtual functions have 3 active BARs. All of these BARs, which are defined in the SR-IOV Enhanced Capability Structure of the physical function, plus any BARs of the physical function itself, fit within the window defined by the base and limit registers of the downstream port of the switch to which the endpoint is attached.

The right side of the figure 402 shows the same virtual function BARs in the domains of three sharing hosts 404, 406, 408. Each host has been assigned only two virtual functions so its BARs have two segments. The BARs of virtual functions assigned to any particular host, segments of its virtual physical function's VF BARs, fit within the virtualized downstream port of its host's virtual switch, as shown on the right hand side of the figure. In both a host's virtual hierarchy and in Global Space, the windows of like numbered BARs of contiguously numbered virtual functions are also contiguous, e.g. VF0 BAR0 is contiguous with VF1 BAR0 but not with VFx BAR2.

As mentioned previously, the virtual function BARs may be defined within a capability structure of the SR-IOV endpoint's physical function. No BAR is shown for this physical function since no address translations are needed for the physical functions—they are accessed only by the management processor which "owns" Global Space.

A virtual physical function may be created for each host by CSR redirection. These can only be accessed in CSR space to allow the management processor to filter all operations on them. Thus, BAR0s for the virtual physical functions also don't appear in the figure. In the virtual implementations, these BARs request no memory space and therefore conventional software won't map them into memory space. A physical function might have a BAR for non-PCIe specified resources that it maps only into memory space. If so, it is just another BAR for which mapping/translation is required and affects only the number of such mapping resources available for use with other physical functions.

In the virtual physical functions created for each host by CSR redirection, each virtual function's BAR is segmented to provide a segment for each virtual function assigned to the host. These virtual function BARs are the ones written by host enumeration software to map the VF's registers into memory space. This makes the memory map visible to the management processor and thus enables it to configure the requisite translations.

In the example, the shared endpoint has a single physical function. Each host has a single virtual physical function whose virtual function BAR segments are shown on the right hand side of the figure. These virtual function BARs are divided in half because each host has been assigned only 2 virtual functions. A single translation may be required for each host for each virtual function BAR of each virtual physical function, no matter how many segments it has been divided into, provided that when multiple VFs are assigned to the host, they are assigned in contiguous blocks and thus use contiguous segments of VF BARs.

Each virtual function BAR of a physical function can be thought of as a meta-BAR since, if more than one virtual function is assigned to the host, it acts as a BAR for all those virtual functions. Although each segment of a virtual function's virtual function BAR is power of two sized and aligned, the window created by the meta-BAR won't be power of two sized unless a power of two virtual functions are assigned to the host. Thus an address range comparison may be required instead of a size-masked equality comparison. Without a size mask available from use in address matching, translation by address offset rather than direct replacement is more economical.

BAR0 is used perhaps exclusively to map CSR space into memory space, BAR1 frequently for I/O space (which isn't allowed in SR-IOV), and BAR2 for MSI-X vector table. If a BAR3 is implemented, it likely maps a memory buffer of some kind. Even without large memory buffers, the BAR window sizes for a multi-physical function endpoint that supports 64 or more virtual functions can be large.

Upstream Routing for SR IOV EP Sharing

The upstream route mechanism can support at least 16 shared EPs in multiple locations on a multi-stage fabric, which may expose more than 256 VFs. Such a requirement is met most economically by a table lookup mechanism. The fact that a contiguous block of VF Requester IDs is assigned to each host for each endpoint reduces the required table size.

An Upstream Route Table can be implemented in every station of a switch and used in the address decode/routing process of the switch's ingress pipeline. If the address or ID in the packet doesn't hit in any downstream port, then the table can specify to which egress port the packet is to be forwarded.

Figure 5:
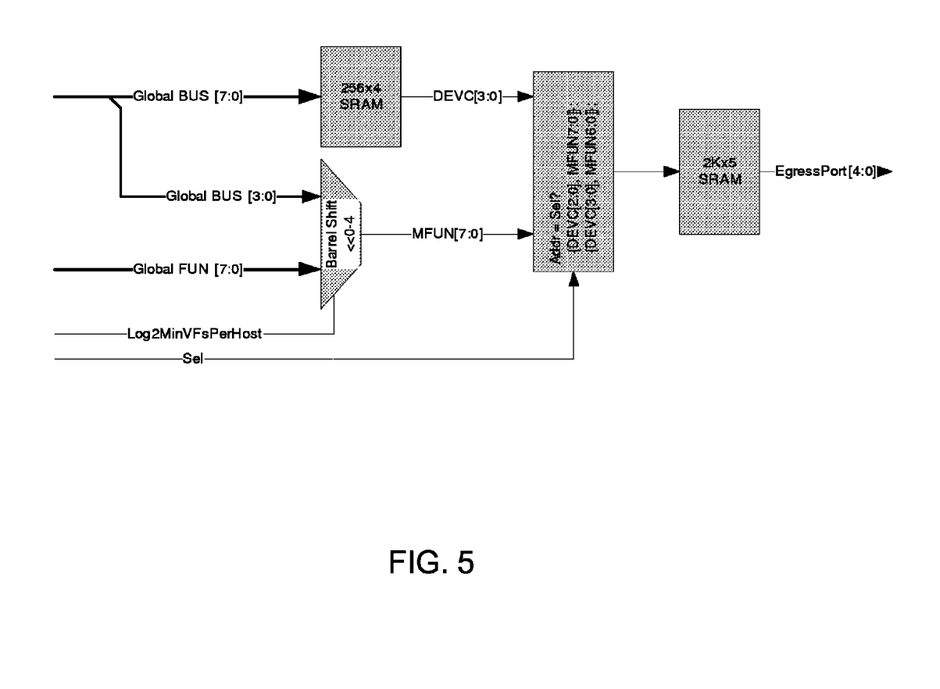
FIG. 5 depicts an example upstream route table in accordance with an embodiment of the present invention.

An example upstream route table is depicted in FIG. 5.

Requester ID Translation for SR IOV Endpoint Sharing

Downstream Requests

Requests sent from a local host domain into global space and targeting the image of another host's memory in global space can have the BUS number of their Requester IDs translated to that of the NT-L EP, which can proxy for the host in the global name space. Returning completions receive a reverse Requester ID translation before being forwarded into the local domain. Since the DMAC associated with the host port uses a different function than the NT-L EP their completions can be differentiated from each other. It is expected that only one or two Requester IDs, e.g. the processor and a chip set DMAC, are used in the local domain but as many as 8 different requesters in the local domain are supported.

The Requester ID of a Shared Endpoint

The local domain Requester ID of a shared endpoint is determined by the virtual switch hierarchy created via CSR redirection. Each endpoint is seen at the downstream port of a virtual switch. Its VFs utilize Requester IDs with BUS numbers inclusively between SEC and SUB of the downstream port's virtual bridge. The global domain Requester ID of a shared endpoint also uses a BUS inclusively between SEC and SUB of its downstream port's virtual bridge. As will be shown, all the Requester IDs of the VFs in global space assigned to a host differ from their local domain Requester IDs by a constant.

The SR-IOV specification provides the following formula, VF N RID=(PF Routing ID+First VF Offset+(N−1)*VF Stride) Modulo $2^{16}$. This formula defines the VF's Requester ID in Global Space, based upon its PF's Global Space Requester ID. The same formula will give the VF's Requester ID in Local Space, based upon its virtual PF's Local Space Requester ID and the values of VF Offset and VF Stride in the virtual PF's SR-IOV enhanced capability structure.

If the Strides are equal to 1 in both domains, then each host is assigned a contiguous block of Requester IDs in both local and global domains. Local and global Requester IDs for the VFs of any shared component then differ by a constant.

If the Stride is greater than 1, we require that the same value of Stride be used in both domains. The local PF's Stride is determined by the global PF's Stride, which is hardwired into the device.

It's helpful to understand usage models for a VF Stride greater than 1. Use of a PF of 2 with a VF Offset that differed by one would make sense if the endpoint had 2 functionally dependent PFs, such as a NIC and an encryption function. Then, consecutive VF Requester IDs would identify dependent pairs of VFs. In the present case, these dependent pairs of VFs would have to be assigned to the same host.

Figure 6:
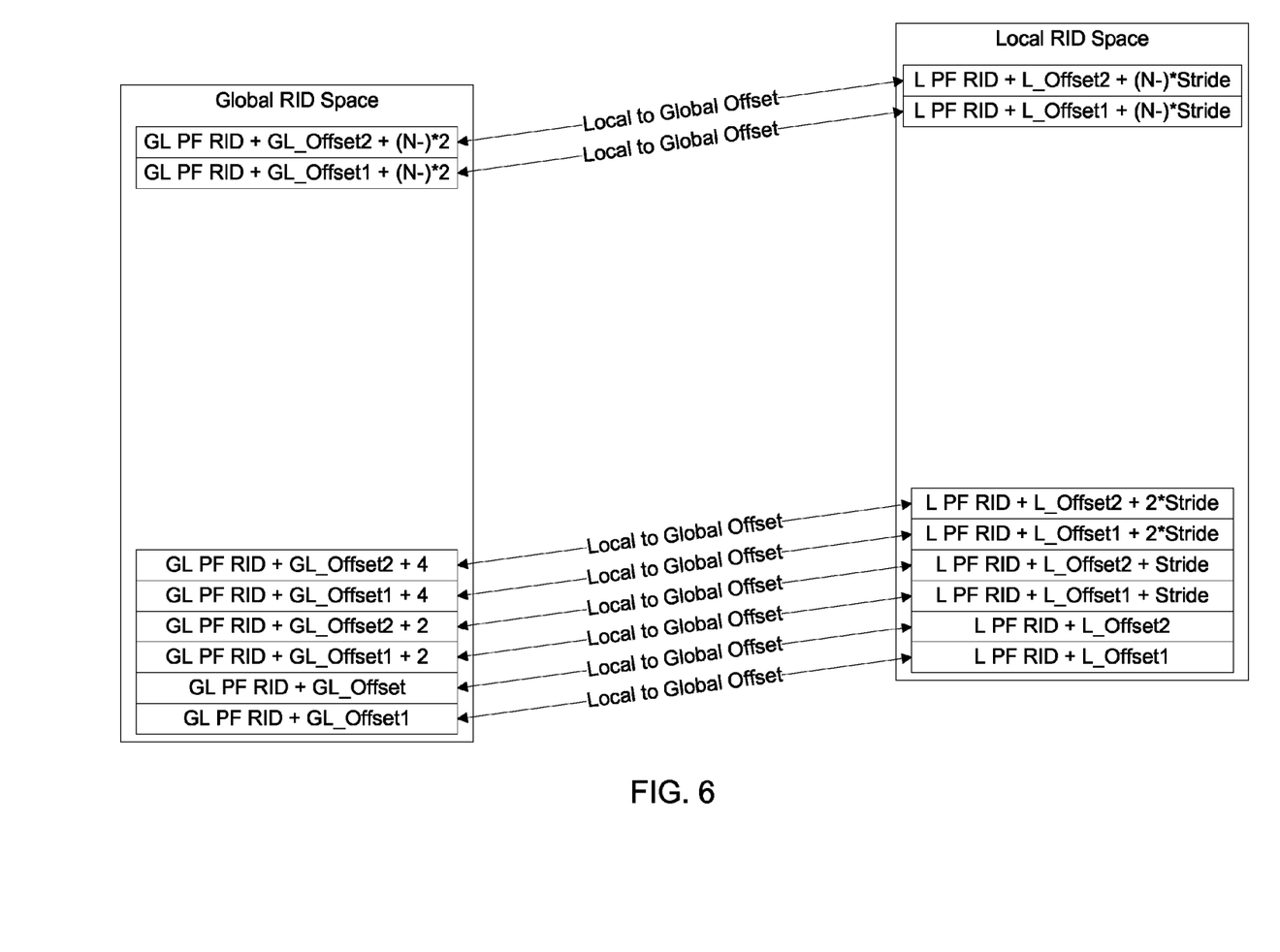
FIG. 6 illustrates the mapping of contiguous global Requester IDs from multiple PFs to the same host with a single local-global Requester ID offset in accordance with an embodiment of the present invention.

Ultimately, when Stride is greater than 1, the Requester IDs in a contiguous block must be assigned to some host. By requiring that they be assigned to the same host, we simplify the translation process, because we again arrive at local and global VFs that differ by a constant. Each host still gets its share of VFs in blocks of at least Stride in size. Since all VFs of the same PF are equivalent, no host is penalized by this requirement. FIG. 6 illustrates the mapping of contiguous global Requester IDs from multiple PFs to the same host with a single local-global Requester ID offset in accordance with an embodiment of the present invention.

The Translation Mechanism

A Global to Local Requester ID translation via arithmetic offset can be performed in the host port egress on requests moving upstream. A Local to Global Translation can be performed in the host ports ingress on their completions returning downstream. In each case, the Translation makes use of a Local <> Global Requester ID Offset Table, with an entry per shared device.

For the forward translation, a two stage lookup may be used. The first look up uses a structure identical to the Upstream Route Table, which will be called the Offset Locator Table to point to the shared device's entry in the Local <> Global Requester ID Offset Table. The second stage is the look up of the offset in the Local < > Global Requester ID Offset Table. Once the offset is determined, it is subtracted from the Global Requester ID and the result is the local domain Requester ID.

For most systems, a station will require either an Upstream Route Table or an Offset Locator Table. Both are required in the same station only if the station's ports contain a mix of host ports and downstream or interswitch ports in global space. The second table instance has a modest additional cost of 11K bits of SP SRAM for the Offset Locator Table and 32×16 bits of register stack for a $2^{nd}$ copy of the Local < > Global Requester ID Offset Table.

For the reverse translation, the downstream ID routing mechanism identifies the shared device and thus its entry in the Local <> Global Requester ID Offset Table. Completions to shared endpoints are routed downstream in the transparent virtual hierarchy using tagged AMCAM entries. The AMCAM entry that hits identifies the virtual downstream port. The tag identifies the physical downstream port. A 1:1 correspondence is made between each AMCAM entry and an entry in the Local < > Global Requester ID Offset Table. (AMCAM[0] is associated with Table[0], AMCAM[1] is associated with Table[2], etc.). The downstream route thus determines the table entry. The offset is looked up and added to the local domain Requester ID and the result is the global Requester ID.

Figure 7:
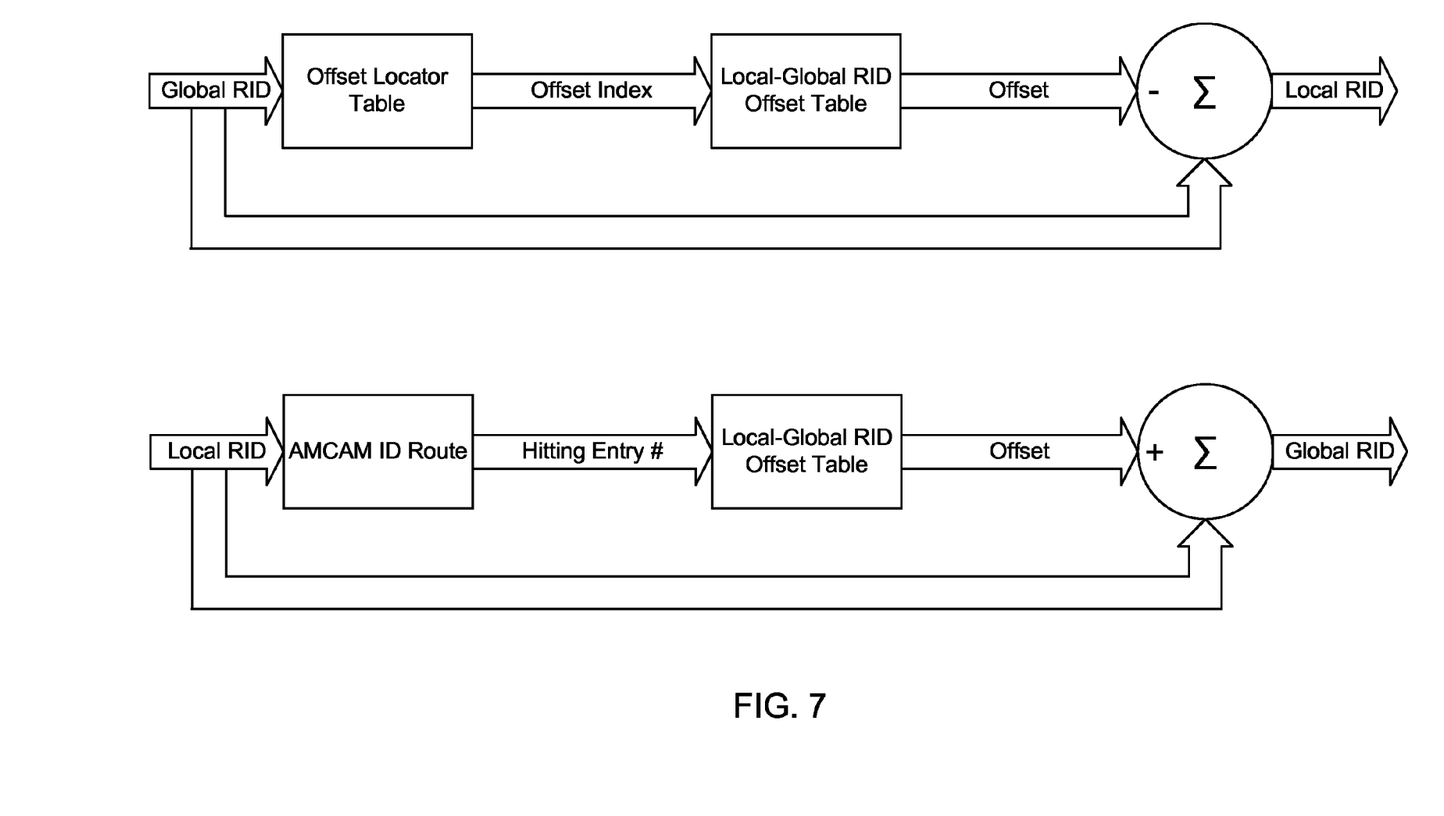
FIG. 7 depicts the forward and reverse Requester ID translation mechanisms for requests from shared endpoints in accordance with an embodiment of the present invention.

The forward and reverse Requester ID translation mechanisms for requests from shared endpoints are illustrated in FIG. 7.

Downstream Reset Propagation

The management processor can be signaled (e.g. interrupted) whenever a host port receives a hot reset or asserts/de-asserts secondary reset of its upstream port's virtual bridge. This can be done by adding this trigger to the existing MSI capability structure at the management upstream port.

Congestion Alarm

If a host fails such that it no longer accepts packets sent to it from an endpoint, congestion could spread ultimately causing completion timeouts to other hosts. To prevent this, a performance monitor can be implemented that can send an interrupt to the management processor when an alarm condition occurred. An alarm could be set on destination queue depth at a host port or lack of credit available to send a required credit update at a downstream port. On such an alarm, management software would diagnose the condition and take remedial action such as taking down a host link and thus allowing its backlog to be discarded.

General Overview

Figure 8:
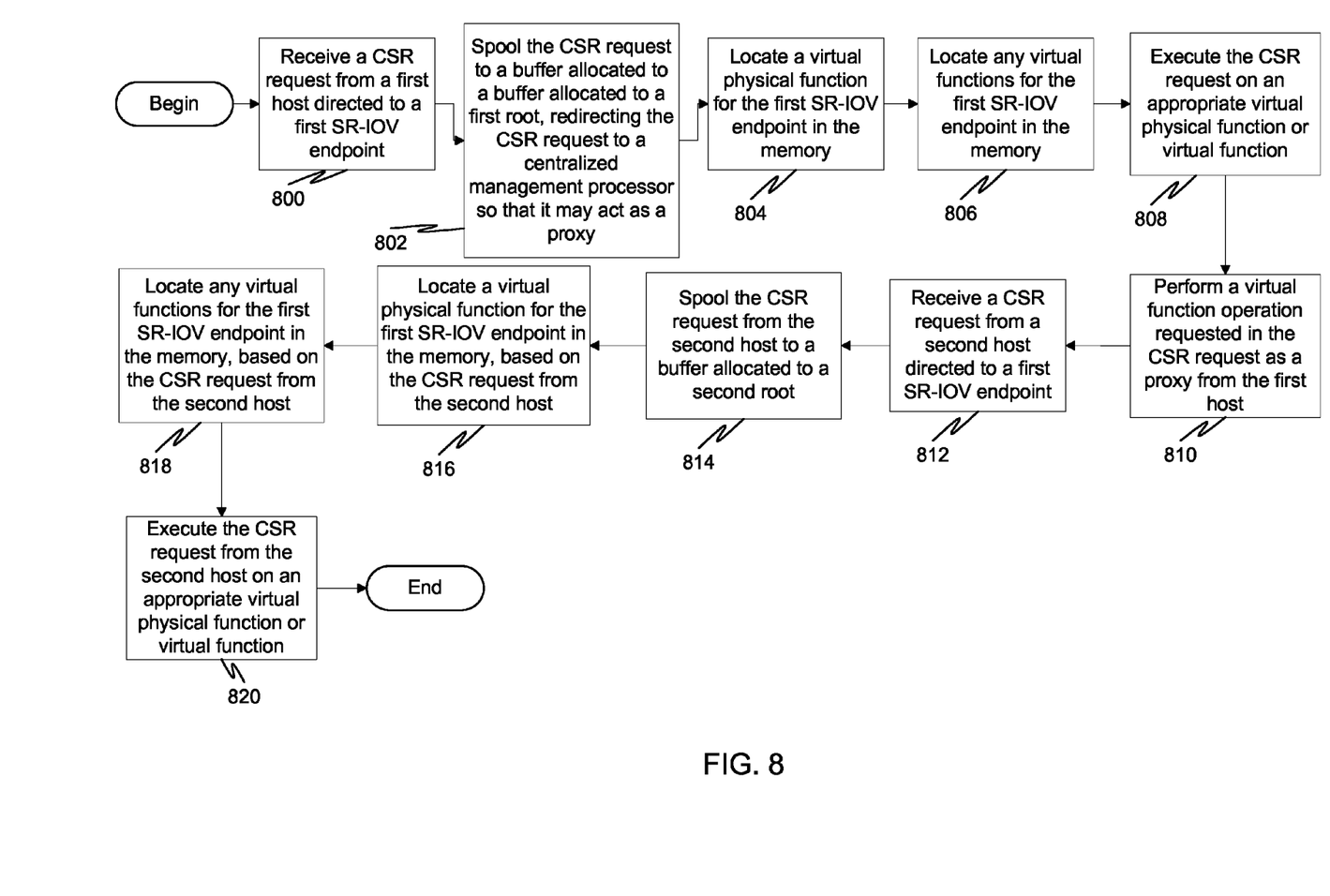
FIG. 8 is a flow diagram illustrating a method for multi-root sharing of a plurality of SR-IOV endpoints in accordance with an embodiment of the present invention.
Figure 9:
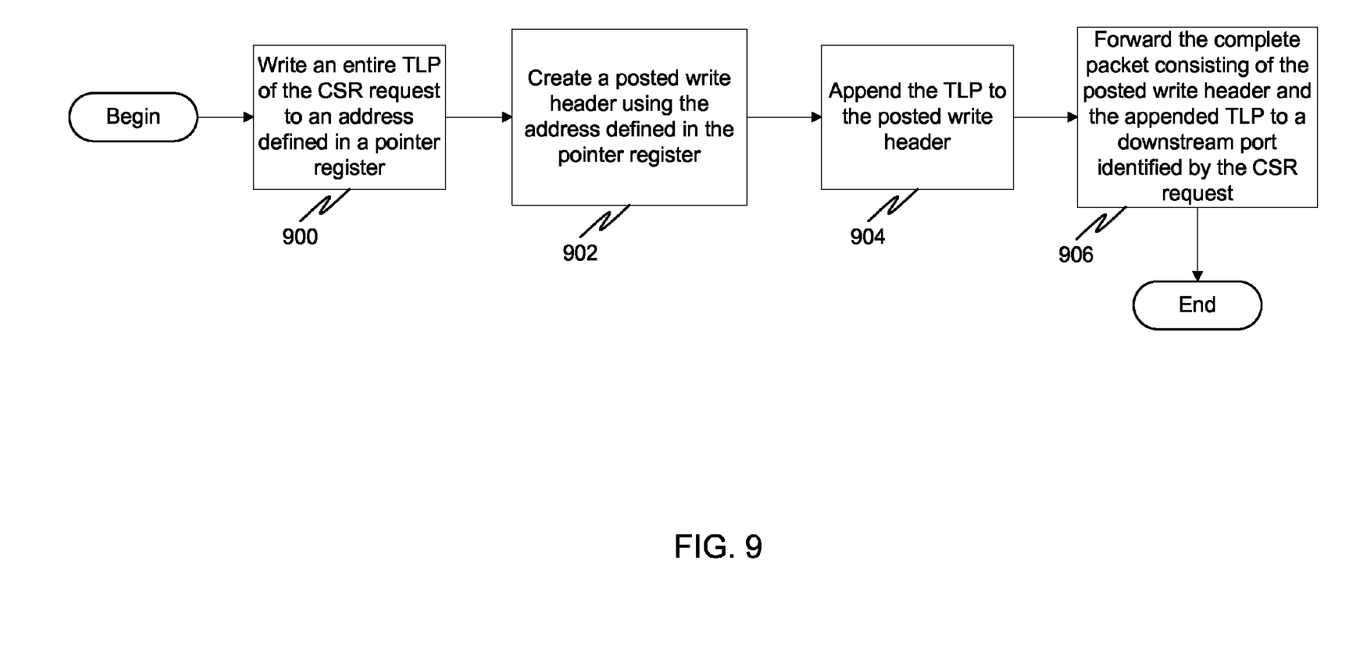
FIG. 9 is a flow diagram illustrating spooling in accordance with an embodiment of the present invention in more detail.

FIG. 8 is a flow diagram illustrating the CSR redirection mechanism used in multi-root sharing of a plurality of SR-IOV endpoints in accordance with an embodiment of the present invention. At 800, a CSR request is received from a first host, wherein the CSR request is directed to a first of the plurality of SR-IOV endpoints. At 802, the CSR request is spooled to a buffer allocated to a first root, redirecting the CSR request to a centralized management processor so that it may act as a proxy. The buffer is located in a memory associated with the centralized management processor. FIG. 9 is a flow diagram illustrating spooling in accordance with an embodiment of the present invention in more detail. At 900, an entire TLP of the CSR request is written to an address defined in a pointer register. At 902, a posted write header is created using the address defined in the pointer register. At 904, the TLP is appended to the posted write header. At 906, the posted write header is forwarded to a downstream port identified by the CSR request. At 908, the pointer register is incremented by the length of the TLP and wrapped back to the base address if necessary.

Referring back to FIG. 8, at 804, the CSR registers of a virtual physical function for the first of the plurality of SR-IOV endpoints is located in the memory of the centralized management processor. By "centralized," it is meant that the management processor is not associated with any one particular port, but is instead shared by many if not all of the hosts connected to the PCIe switch fabric. The management processor may be implemented as part of one of a plurality of switches comprising a fabric, or may be attached to the upstream port of one of the switches. Multiple management processors may be used to potentially increase performance. At 806, the registers of any virtual physical functions or virtual functions assigned to the first of the plurality of SR-IOV endpoints located in the memory of the centralized management processor or in the shared endpoint itself are located. At 808, the CSR request is executed on the appropriate register of the appropriate virtual physical function or virtual function and optionally also on a copy of the virtual function's register maintained in the memory of the management processor. The "appropriate" selection is based upon to what virtual or physical function the CSR request was initially directed, e.g., based on the address included in the CSR request so selection is simply the act of decoding the address done unconventionally in software rather than by hardware, followed by an address and requester ID translation, mimicking the switches decode and translation steps for requests made by a host that aren't redirected. This may include, for example, accessing mappings between the local domain address and or ID ranges that correspond to each virtual or virtual physical function's registers and both the memory locations in global space at which the physical instances of the registers are located and the locations in the management processor's memory at which it maintains copies of the contents of these registers. At 810, the management processor performs a virtual function operation requested in the CSR request as a proxy from the first host. In this step, the system actually writes to the physical virtual registers in the shared endpoint but also, if maintaining a copy in its memory, may also write to that copy there.

At 812, a CSR request is received from a second host, wherein the CSR request is also directed to the first of the plurality of SR-IOV endpoints. At 814, the CSR request from the second host is spooled to a buffer allocated to a second root in memory of the centralized management processor. At 816, a virtual physical function for the first of the plurality of SR-IOV endpoints is located in the memory of the centralized management processor, based upon the CSR request from the second host. Specifically, it is the register of the function that is located.

At 818, any virtual functions assigned to the first of the plurality of SR-IOV endpoints located in the memory of the centralized management processor are located, based upon the address in the CSR request from the second host. At 820, the CSR request from the second host is executed on an appropriate virtual physical function or virtual function assigned to the first of the plurality of SR-IOV endpoints located in the memory.

Figure 10:
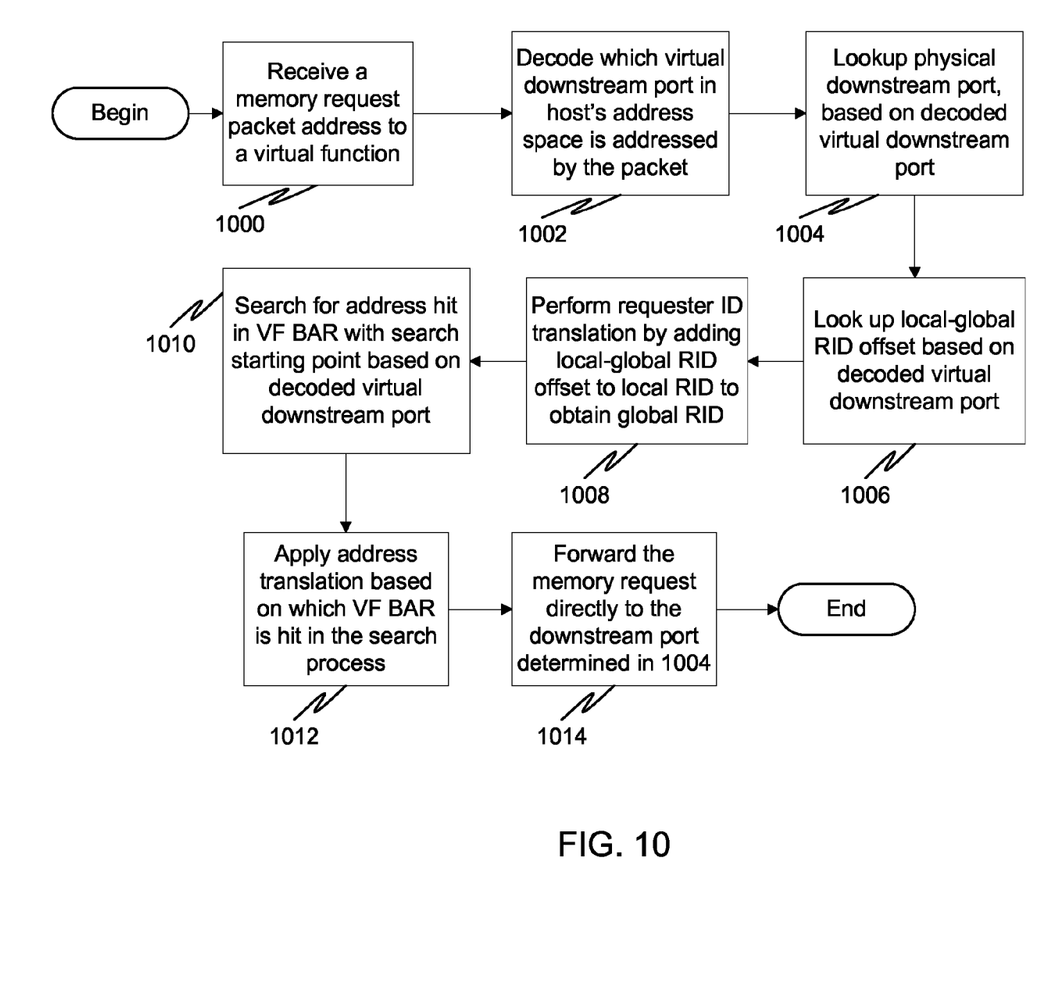
FIG. 10 is a flow diagram of the processing of a memory request in accordance with an embodiment of the present invention.

FIG. 10 is a flow diagram of the processing of a memory request in accordance with an embodiment of the present invention. Instead of being redirected, it is forwarded with address and requester ID translations. These memory requests that aren't redirected can flow through the switch independently of and concurrently with the processing of redirected requests. At 1000, a memory request packet addressed to a virtual function is received. At 1002, which virtual downstream port in the host's address space is addressed by the packet is decoded. At 1004, the physical downstream port is looked up based on the decoded virtual downstream port.

At 1006, a local-global RID offset is looked up based on the decoded virtual downstream port. At 1008, requester ID translation is performed. Here, the local-global RID offset is added to the local RID to obtain a global RID. At 1010, an address hit in the VF BAR is searched for with the search starting point based on the decoded virtual downstream port. At 1012, address translation based on which VF BAT is hit in the search process is applied. At 1014, the memory request is forwarded directly to the downstream port determined in 1004.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over networkcoupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for multi-root sharing of a plurality of single root input/output virtualization (SR-IOV) endpoints, the method comprising:
    receiving a control and status register (CSR) request packet from a first host, wherein the CSR request packet is a CSR Space packet or a memory mapped I/O request packet, wherein the CSR request packet is addressed to the first of the plurality of SR-IOV endpoints;
    redirecting the CSR request packet to a centralized management processor so that the centralized management processor may act as a proxy to communicate with the first of the plurality of SR-IOV endpoints;
    executing the CSR request on a virtual function or physical function register, identified in the CSR request, in the first of the plurality of SR-IOV endpoints; and
    spooling the CSR request to a buffer allocated to a first root;
    wherein the spooling comprises: writing an entire transaction layer packet (TLP) of the CSR request to an address defined in a pointer register;
    creating a posted write header using the address defined in the pointer register;
    appending the TLP to the posted write header as a payload; and
    forwarding a complete packet comprising the posted write header and the appended CSR request TLP to a downstream port identified by the address in the request.

2. The method of claim 1, further comprising:
    locating registers of a virtual physical function for the first of the plurality of SR-IOV endpoints in memory of a centralized management processor;
    locating registers of any virtual functions of that shared endpoint that are assigned to a host which originated the CSR request packet and are addressed by it that are located in a memory of the management processor; and
    executing the CSR request packet on the appropriate virtual physical function register or virtual function register in the memory of the management processor.

3. The method of claim 1, further comprising:
    translating requester identifiers (IDs) of requests sent from the first host to include the global space bus number of the non-transparent bridge, which provides for completion packets to be returned to the host; and
    reverse translating requester IDs of return completions sent to the non-transparent port so that the translated requester ID matches that in the original CSR request packet.

4. The method of claim 2, further comprising:
    receiving a CSR request packet from a second host, wherein the CSR request packet is directed to the first of the plurality of SR-IOV endpoints;
    redirecting the CSR request packet from the second host to a centralized management processor so that the centralized management processor may act as a proxy to communicate with the first of the plurality of SR-IOV endpoints; and
    executing the CSR request packet from the second host on an appropriate virtual physical function or virtual function register in the first of the plurality of SR-IOV endpoints, and/or a virtual image or copy of the register in the memory of the management processor.

5. The method of claim 1, further comprising:
    routing transactions sent upstream by the plurality SR-IOR endpoints by global space requester identifier.

6. A method for multi-root sharing of a plurality of single root input/output virtualization (SR-IOV) endpoints, the method comprising:
    receiving a control and status register (CSR) request packet from a first host, wherein the CSR request packet is a CSR Space packet or a memory mapped I/O request packet, wherein the CSR request packet is addressed to a first of the plurality of SR-IOV endpoints;
    redirecting the CSR request packet to a centralized management processor so that the centralized management processor may act as a proxy to communicate with the first of the plurality of SR-IOV endpoints; and
    accessing a mapping between host domain addresses of virtual function base addresses and their global domain addressed in order to translate the address in a memory mapped I/O request packet that addresses a register of a virtual function in a first SR-IOV endpoint wherein a translation is provided for each VF Base Address Register (BAR) of each contiguous group of VFs in each SR-IOV endpoint assigned to the first host.

7. A method for multi-root sharing of a plurality of single root input/output virtualization (SR-IOV) endpoints, the method comprising:
    receiving a control and status register (CSR) request packet from a first host, wherein the CSR request packet is a CSR Space packet or a memory mapped I/O request packet, wherein the CSR request packet is addressed to a first of the plurality of SR-IOV endpoints;
    redirecting the CSR request packet to a centralized management processor so that the centralized management processor may act as a proxy to communicate with the first of the plurality of SR-IOV endpoints; and
    further comprising:
    receiving a memory space request packet addressed to a virtual function of an SR-IOV endpoint; and
    forwarding the memory space request packet directly to an appropriate downstream port.

8. The method of claim 7, wherein the forwarding includes performing address and requester ID translation on the memory space request packet.

9. The method of claim 8, wherein the translated requester ID of the memory request includes a global space bus number of a non-transparent bridge located at a switch port to which the first host is attached.

10. A system comprising:
    a switch having:
        a plurality of upstream ports, each upstream port connected to a different host and each represented by both a virtual transparent PCI-PCI bridge and a non-transparent bridge;
        a plurality of downstream ports, each downstream port connected to a different SR-IOV endpoint and each represented by a virtual PCI-PCI bridge;
    a management processor;

a memory associated with the management processor, wherein the memory contains a plurality of CSR registers that control the virtual PCI-to-virtual PCI bridges;

wherein the switch is configured to:

receive a control and status register (CSR) request packet from a first host, wherein the CSR request packet is a CSR Space packet or a memory mapped I/O request packet, wherein the CSR request packet is addressed to a first of the plurality of SR-IOV endpoints; and redirect the CSR request packet to a centralized management processor so that the centralized management processor may act as a proxy to communicate with the first of the plurality of SR-IOV endpoints.

11. The system of claim 10, wherein the management processor is configured to:

locate registers of a virtual physical function for the first of the plurality of SR-IOV endpoints in memory of a centralized management processor;

locate registers of any virtual functions of that shared endpoint that are assigned to a host which originated the CSR request packet and are addressed by it that are located in a memory of the management processor; and execute the CSR request packet on the appropriate virtual physical function register or virtual function register in the memory of the management processor.

12. The system of claim 11, wherein the switch is further configured to:

spool the CSR request to a buffer allocated to a first root.

13. The system of claim 12, wherein the spooling comprises:

writing an entire transaction layer packet (TLP) of the CSR request to an address defined in a pointer register;

creating a posted write header using the address defined in the pointer register;

appending the TLP to the posted write header as a payload; and forwarding a complete packet comprising the post write header and the appended CSR request TLP to a downstream port identified by the address in the request.

14. The system of claim 10, wherein the management processor is further configured to:

access a mapping between host domain addresses of virtual function base addresses and global domain addresses in order to translate an address in a memory mapped I/O request packet that addresses a register of a virtual function in a first SR-IOV endpoint wherein a translation is provided for each VF Base Address Register (BAR) of each contiguous group of VFs in each SR-IOV endpoint assigned to the first host.

15. A program storage device readable by a machine tangibly embodying a program of instructions executable by the machine to perform a method for multi-root sharing of a plurality of single root input/output virtualization (SR-IOV) endpoints, the method comprising:

receiving a control and status register (CSR) request packet from a first host, wherein the CSR request packet is a CSR Space packet or a memory mapped I/O request packet, wherein the CSR request packet is addressed to the first of the plurality of SR-IOV endpoints;

redirecting the CSR request packet to a centralized management processor so that the centralized management processor may act as a proxy to communicate with the first of the plurality of SR-IOV endpoints;

executing the CSR request on a virtual function or physical function register, identified in the CSR request, in the first of the plurality of SR-IOV endpoints; and spooling the CSR request to a buffer allocated to a first root;

wherein the spooling comprises: writing an entire transaction layer packet (TLP) of the CSR request to an address defined in a pointer register;

creating a posted write header using the address defined in the pointer register;

appending the TLP to the posted write header as a payload; and forwarding a complete packet comprising the posted write header and the appended CSR request TLP to a downstream port identified by the address in the request.

16. A program storage device readable by a machine tangibly embodying a program of instructions executable by the machine to perform a method for multi-root sharing of a plurality of single root input/output virtualization (SR-IOV) endpoints, the method comprising:

receiving a control and status register (CSR) request packet from a first host, wherein the CSR request packet is a CSR Space packet or a memory mapped I/O request packet, wherein the CSR request packet is addressed to a first of the plurality of SR-IOV endpoints;

redirecting the CSR request packet to a centralized management processor so that the centralized management processor may act as a proxy to communicate with the first of the plurality of SR-IOV endpoints; and accessing a mapping between host domain addresses of virtual function base addresses and their global domain addressed in order to translate the address in a memory mapped I/O request packet that addresses a register of a virtual function in a first SR-IOV endpoint wherein a translation is provided for each VF Base Address Register (BAR) of each contiguous group of VFs in each SR-IOV endpoint assigned to the first host.

17. A program storage device readable by a machine tangibly embodying a program of instructions executable by the machine to perform a method for multi-root sharing of a plurality of single root input/output virtualization (SR-IOV) endpoints, the method comprising:

receiving a control and status register (CSR) request packet from a first host, wherein the CSR request packet is a CSR Space packet or a memory mapped I/O request packet, wherein the CSR request packet is addressed to a first of the plurality of SR-IOV endpoints;

redirecting the CSR request packet to a centralized management processor so that the centralized management processor may act as a proxy to communicate with the first of the plurality of SR-IOV endpoints; and further comprising:

receiving a memory space request packet addressed to a virtual function of an SR-IOV endpoint; and forwarding the memory space request packet directly to an appropriate downstream port.

* * * * *